(12) United States Patent
Günther et al.

(10) Patent No.: US 10,985,422 B2
(45) Date of Patent: Apr. 20, 2021

(54) BATTERY HOUSING FOR A VEHICLE DRIVEN BY AN ELECTRIC MOTOR

(71) Applicant: Kirchhoff Automotive Deutschland GmbH, Attendorn (DE)

(72) Inventors: Alexander Günther, Olpe (DE); Stefan Brandl, Mitterteich (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 182 days.

(21) Appl. No.: 16/320,207

(22) PCT Filed: Aug. 7, 2017

(86) PCT No.: PCT/EP2017/069910
§ 371 (c)(1),
(2) Date: Jan. 24, 2019

(87) PCT Pub. No.: WO2018/046207
PCT Pub. Date: Mar. 15, 2018

(65) Prior Publication Data
US 2019/0273231 A1    Sep. 5, 2019

(30) Foreign Application Priority Data

Sep. 7, 2016   (DE) .......................... 102016116729.0

(51) Int. Cl.
*H01M 50/20* (2021.01)
*H01M 50/204* (2021.01)
(Continued)

(52) U.S. Cl.
CPC ......... *H01M 50/20* (2021.01); *H01M 50/204* (2021.01); *H01M 50/207* (2021.01); *H01M 50/233* (2021.01); *H01M 2220/20* (2013.01)

(58) Field of Classification Search
CPC ............. H01M 2/1083; H01M 2/1016; H01M 2/1077; H01M 2220/20; H01M 50/233;
(Continued)

(56) References Cited

U.S. PATENT DOCUMENTS 10,424,770 B2    9/2019  Günther
2010/0221591 A1* 9/2010  Ro kamp ............ H01M 2/1055
                                                        429/99

(Continued)

FOREIGN PATENT DOCUMENTS

DE    102010022876 A1    1/2011
DE    102011111229 A1    2/2013
(Continued)

OTHER PUBLICATIONS

International Search Report dated Mar. 15, 2018 in parent International application PCT/EP2017/069910.
(Continued)

*Primary Examiner* — Jonathan G Jelsma
(74) *Attorney, Agent, or Firm* — Polson Intellectual Property Law, PC; Margaret Polson; Christopher Sylvain

(57) ABSTRACT

A battery housing for a vehicle driven by an electric motor comprises a tray part with a bottom and side walls formed thereon, for receiving at least one battery module. The side walls of the tray part are respectively interconnected by a curved edge section. Said battery housing is characterized in that each curved edge section of the tray part is connected to at least one of the side walls connected thereby, with a connecting wall section curved in the opposite direction to the curved edge section being connected between the respective curved edge sections and side walls, and the side walls as well as each curved edge section and each curved connecting wall section are at a distance from the, or the plurality of, battery module(s).

13 Claims, 7 Drawing Sheets

(51) Int. Cl.
*H01M 50/233* (2021.01)
*H01M 50/207* (2021.01)

(58) Field of Classification Search
CPC ... H01M 50/207; H01M 50/204; H01M 50/20
See application file for complete search history.

(56) References Cited

U.S. PATENT DOCUMENTS

| | | | |
|---|---|---|---|
| 2010/0307848 A1* | 12/2010 | Hashimoto | B60L 50/64 180/68.5 |
| 2012/0244397 A1 | 9/2012 | TenHouten et al. | |
| 2013/0059185 A1 | 3/2013 | Whitacre et al. | |
| 2015/0318525 A1* | 11/2015 | Maguire | H01M 2/1077 429/96 |
| 2016/0226041 A1* | 8/2016 | Jackson | H01M 10/6556 |
| 2017/0200926 A1* | 7/2017 | Motokawa | H01M 10/425 |
| 2019/0036092 A1 | 1/2019 | Günther | |
| 2019/0229311 A1 | 7/2019 | Günther | |
| 2019/0252741 A1 | 8/2019 | Günther | |
| 2019/0259994 A1 | 8/2019 | Günther | |
| 2019/0381899 A1 | 12/2019 | Günther | |

FOREIGN PATENT DOCUMENTS

| | | |
|---|---|---|
| DE | 202016102223 U1 | 5/2016 |
| DE | 102015015975 A1 | 8/2016 |
| EP | 2565958 A1 | 3/2013 |
| EP | 2685523 A1 | 1/2014 |
| EP | 2741343 A1 | 6/2014 |

OTHER PUBLICATIONS

International Preliminary Report on Patentability dated Mar. 4, 2019 in parent International application PCT/EP2017/069910.
Office Action dated Feb. 1, 2021 in related Chinese application 201780054042.5 [A concise explanation of relevance is provided by the "Y" indications in the table on p. 9 of the Office Action, as the English translation of the Office Action is not currently available in Global Dossier—see MPEP 609.04(a)(III)].

* cited by examiner

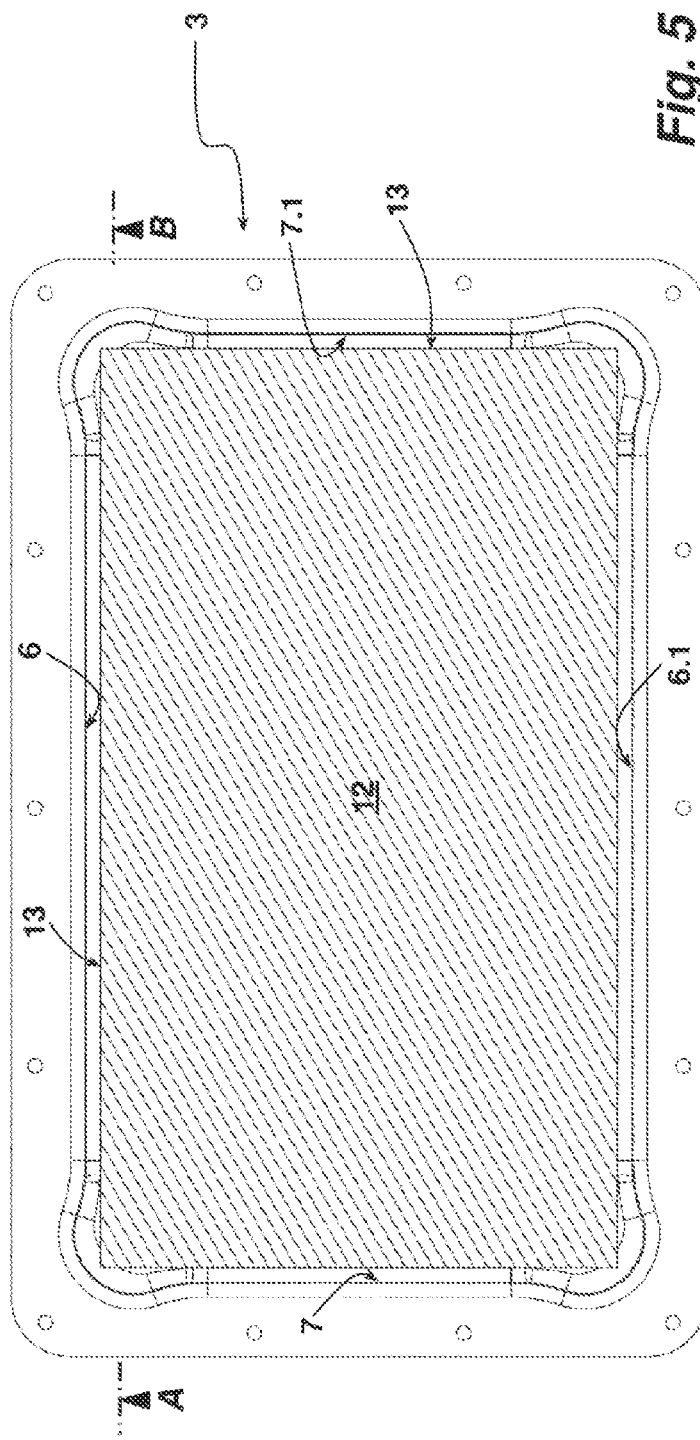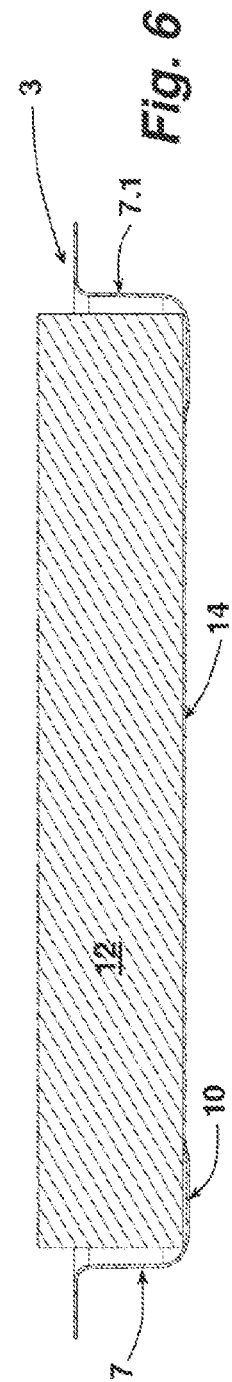

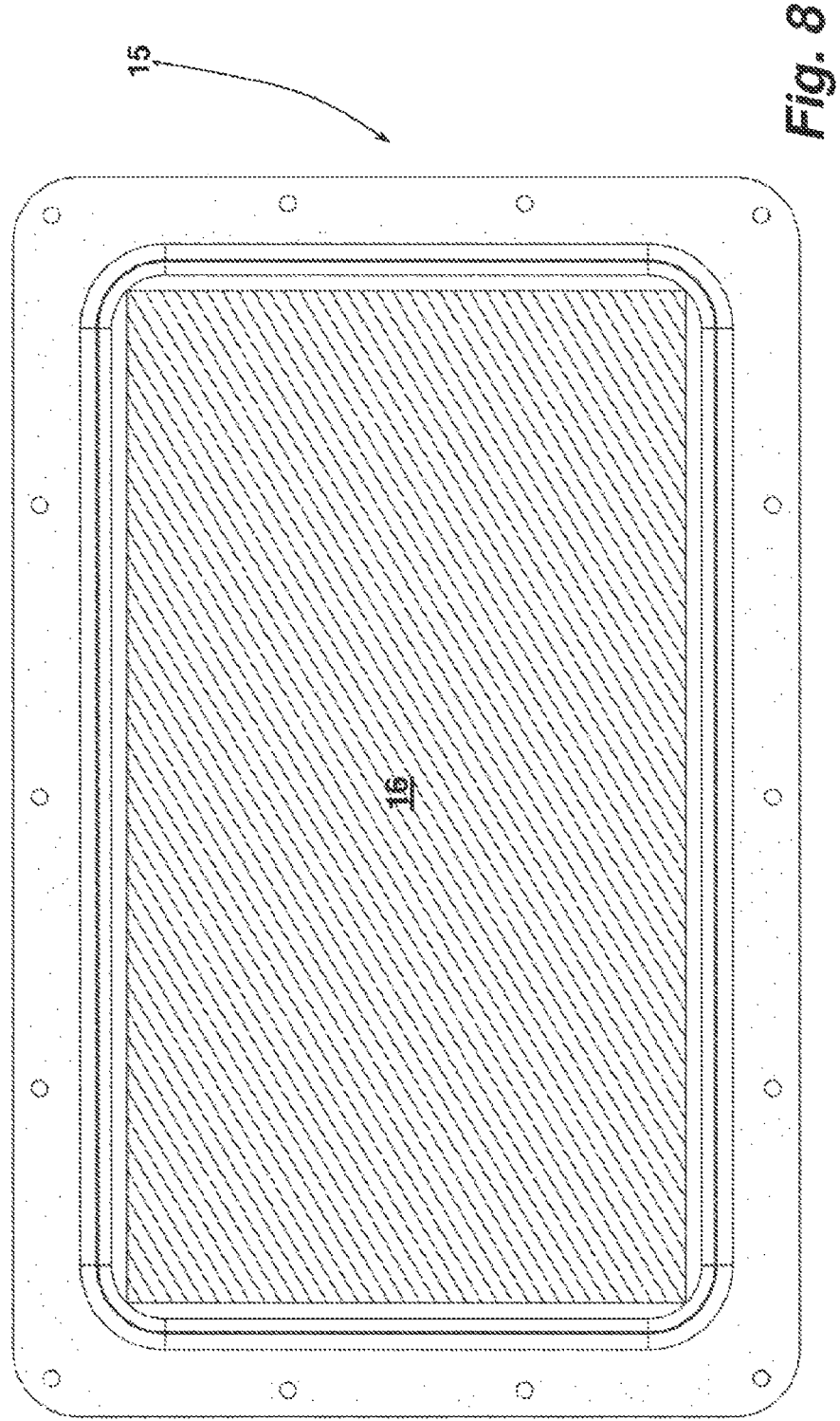

BATTERY HOUSING FOR A VEHICLE DRIVEN BY AN ELECTRIC MOTOR

BACKGROUND

The present disclosure relates to a battery housing for a vehicle driven by an electric motor, said housing having a tray part with a bottom and side walls formed thereon for receiving one or multiple battery modules, wherein said side walls of the tray part are respectively interconnected by a curved edge section.

Battery modules are used as power accumulators in vehicles driven by an electric engine, such as passenger cars, industrial trucks, or the like. Such battery modules are typically composed of a plurality of individual batteries. These batteries are so-called high-voltage batteries. Specific requirements must be met for housing such battery modules needed for operating such a vehicle. It is essential that the battery module(s) is/are protected from external influences in their battery housing. Furthermore, the battery module(s) must be housed in a battery housing sealed against the ingress of moisture to prevent the formation of condensate inside the battery housing. Moisture penetrating into the battery compartment of the battery housing can cause a short circuit, which can cause a fire of the battery module.

Weight carried along is a major factor in vehicles driven by an electric engine, which is why such vehicles are typically of a compact design. This requires that the units needed for operating the vehicle should be as compact as possible, and the available installation space should be used as best as possible. This includes the battery volume required for operating the vehicle. Against this background, it is desirable to use battery housings for these purposes which can accommodate as much battery volume as possible but are still cost-effective to manufacture. A cost-effective way to manufacture battery housings is to make them from two formed sheet-metal parts. At least one of these formed sheet-metal parts has been made from a steel plate using a deep-drawing process to form the desired tray structure. The other part can be designed as a flat lid or as a second tray part. In the latter case, the battery housing is provided by two tray-like half shells. Using steel parts to manufacture these battery housings ensures the required stability properties such a battery housing should have to protect the battery modules arranged therein, even at a low wall thickness. However, when forming steel plates and configuring the wall geometry, care must be taken that the radii do not become too small in the forming process to prevent torn material in the deep-drawing process.

EP 2 565 958 B1 discloses a battery housing with a circumferential groove impressed into the bottom of the tray part, which groove thus borders each side wall. This makes it possible that a battery module placed therein in the longitudinal direction or transverse direction of the tray part can be aligned to rest against opposite side walls. This is to allow the best possible utilization of battery volume encased in the tray part. However, this only allows the use of the available tray volume in the longitudinal and transverse direction because the corner connecting two side walls is curved and typically has a greater radius of curvature than the transition of the bottom into the side walls formed thereon. The battery modules themselves typically do not have any rounded edges. A battery housing according to the introduction is known from DE 20 2016 102 223 U1.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

Against this background, an aspect of the present disclosure is to further develop a battery housing of the type mentioned above in such a manner that not only is its manufacture cost-effective, but also the utilization of the available volume is improved and complies with safety requirements.

This is achieved by a battery housing of the type mentioned above wherein each curved edge section of the tray part is connected to at least one of the side walls connected thereby with a connecting wall section curved in the opposite direction to the curved edge section being connected between the respective curved edge sections and side walls, and the side walls as well as each curved edge section and each curved connecting wall section are at a distance from the, or the plurality of, battery module(s).

This battery housing has a special design of the curved edge sections connecting the two side walls. The particular feature of this tray part is that the radial center point of the curved wall sections is outwardly offset compared to conventional designs. In this manner, the usable battery volume inside the tray part is increased without having to decrease the radius of curvature of the edge sections connecting the two side walls. Thus, such a tray can be manufactured in a cost-effective manner by deep drawing a metal plate, particularly a steel plate. The offset of the radial center point is achieved in that a connecting wall section, which has a curvature in the opposite direction of the curvature of the edge section, is connected to at least one side wall of each edge section. This connecting wall section represents the connection of a straight side wall with the curved edge section.

When deep drawing a metal plate, particularly a steel plate, the radii between the bottom and the side walls can regularly be dimensioned considerably smaller than the radii in the configuration of the edges connecting the two side walls, without having to fear tearing of the material. While the radii in the transition from the bottom into the side walls may indeed just be 5 mm for a steel plate, radii of typically more than 20 mm must be selected for the curved edge sections to prevent tearing of the material in the deep-drawing process. Due to the configuration of the edges described above, the entire area of the bottom of the tray part up to the transition into the radius for connecting the bottom to the side walls can be used, at appropriate dimensioning, for one or multiple battery modules. In some embodiments, the radius connecting the bottom to the side walls is used to ensure a safety distance between the battery module(s) received in the tray part and the side walls of the tray part. Such a distance between the inner side of the side walls of a battery housing and the battery volume received therein is desired for safety reasons. This is remarkable, since the subject matter of EP 2 565 958 B1 only allowed optimization of the usable tray volume if the battery module(s) was/were aligned to rest against two opposite side walls of the battery housing.

In some embodiments, a connecting wall section curved in the opposite direction to the curved edge sections is provided between the curved edge sections in the transition to each adjacent side wall. The advantage of such a configuration is that the outward offset of the curved edge section can be minimal. This is the case when the radial center point of the curved edge section is offset outwards from the volume enclosed by the tray part on the angle bisector of the angle formed by adjacent side walls. The connecting wall sections curved in the opposite direction to the curved edge sections are typically configured identically in such embodiments. Greater radii can be selected for creating the connecting wall section(s), particularly greater radii than provided for creating the curved edge section. Such minimizing of the offset of the radial center point of curvature is useful because the width of a mounting flange formed onto the top side of the tray part and protruding outwards does not have to be increased to dispose a circumferential gasket thereon. This will be the rule. Such a tray will be closed with a lid part to meet requirements for the use of such battery housings in vehicles. The lid part can be designed as a flat part. Likewise, the lid part can also be configured tray-like, as described above. The height of the lid part can match that of the tray part or differ therefrom. The height of the lid part will typically be dimensioned smaller than the height of the tray part.

In a further development, the bottom of the tray part in the region of the curved edge sections and in the region of the at least one connecting wall section is impressed, thereby increasing the volume enclosed by the tray part. In such an embodiment, the radius between the impressed bottom section and the adjacent edge section or connecting wall section can be dimensioned greater in proportion to the depth of the impression. As a result of this measure, the radial center point of the curvature of the edge section can be slightly offset towards the volume of the tray part, which makes it possible to slightly reduce the dimension of the bulging with respect to the adjacent side wall(s) caused by the described configuration of the edge sections. In addition, such an impression has a mechanically stabilizing effect and allows the arrangement of a fastening means for a battery module arranged in the tray part. This fastening means can, for example, be a nut fixed on the bottom of the impression. Other fastening means are conceivable at this site. In this configuration, the battery volume inside the tray part can be fastened without fasteners that penetrate through the tray part. This has a positive effect on the impermeability of such a battery housing.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

The present disclosure is described below in terms of an embodiment with reference to the appended figures. Wherein:

FIG. 5: shows the battery housing as depicted in FIG. 4 with a battery module inserted therein;

FIG. 6: shows a sectional view along the line A-B of FIG. 5;

FIG. 8: shows a representation corresponding to that of FIG. 5 of a conventional tray part with a battery module inserted therein.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

Figure 1:
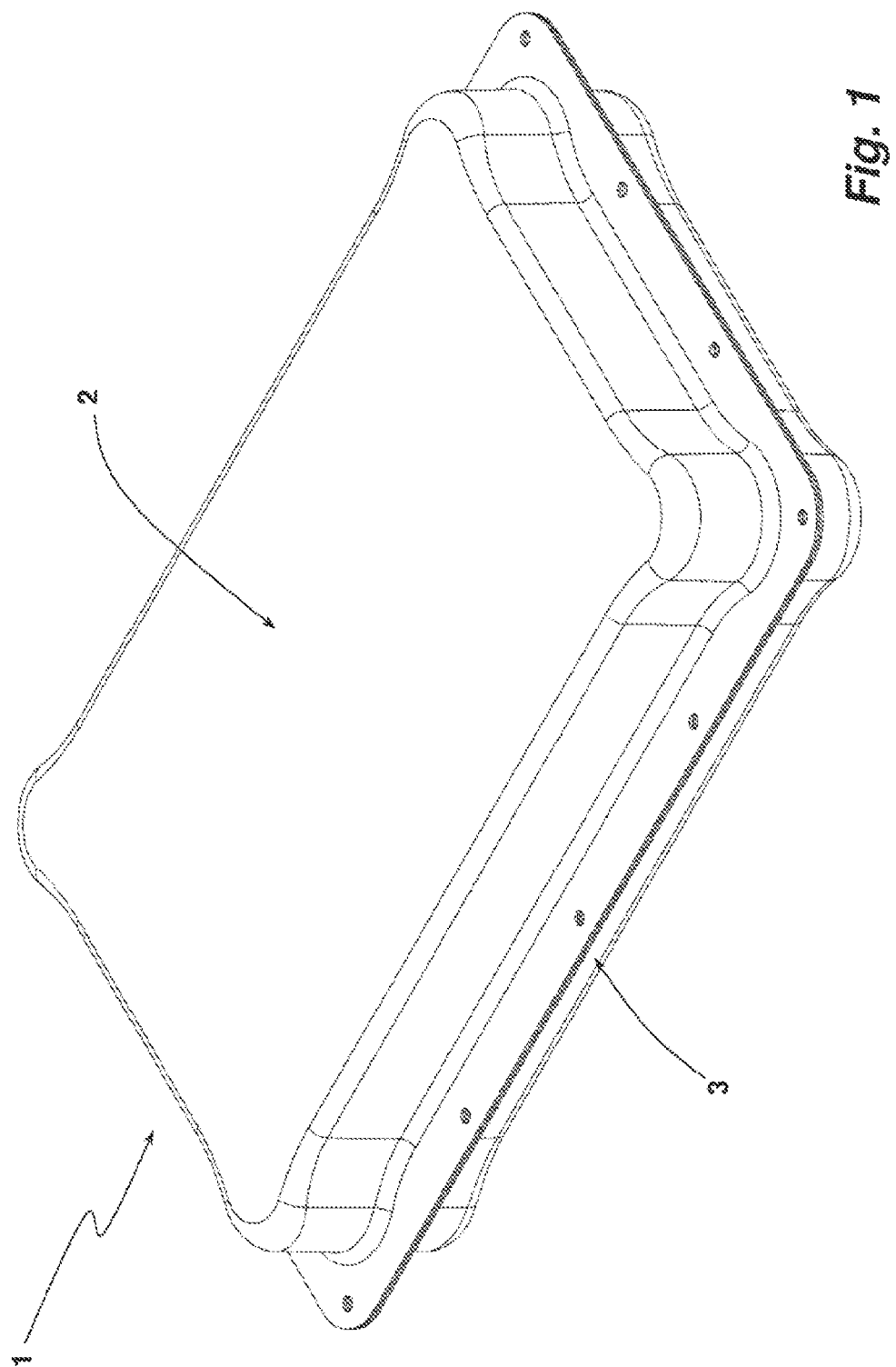
FIG. 1: shows a perspective view of a battery housing with a lid part and a tray part.
Figure 2:
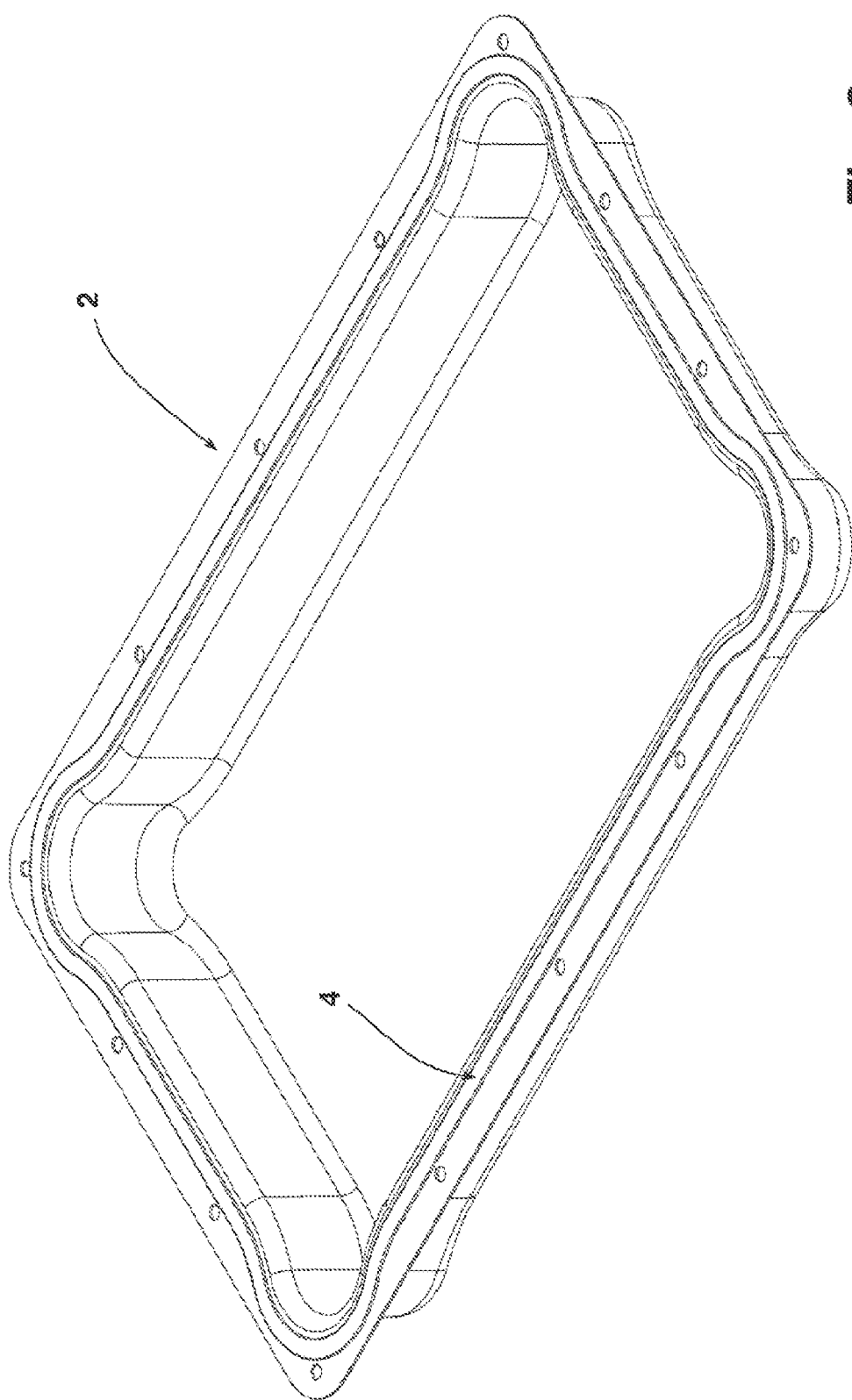
FIG. 2: shows a bottom perspective view of the lid part of the battery housing from FIG. 1.

A battery housing 1 includes a lid part 2 and a tray part 3. The battery housing 1 is used for receiving one or multiple battery modules as power source(s) for one or multiple electric motors of a vehicle. The battery housing 1 is therefore intended to be fastened to the frame of a vehicle or to be a part of such frame. The lid part 2 and the tray part 3 are sealingly connected using threaded fasteners not shown in detail. Openings for conducting electric connecting cables are not shown in the figures for the sake of simplicity. The bottom perspective view of the lid part 2 in FIG. 2 shows that a circumferential gasket 4 is arranged between the lid part 2 and the tray part 3.

The present disclosure will be explained in greater detail below with reference to the tray part 3. The lid part 2 is designed in the same manner, such that the description below also applies to the lid part 2.

The tray part 3 was manufactured from a steel plate by a deep-drawing process. The tray part 3 includes a bottom 5 and side walls 6, 6.1, 7, 7.1 formed thereon. The side walls 6, 6.1 represent the side walls following the longitudinal extension of the battery housing 1. The side walls 7, 7.1 are transverse walls due to their shorter configuration.

Figure 3:
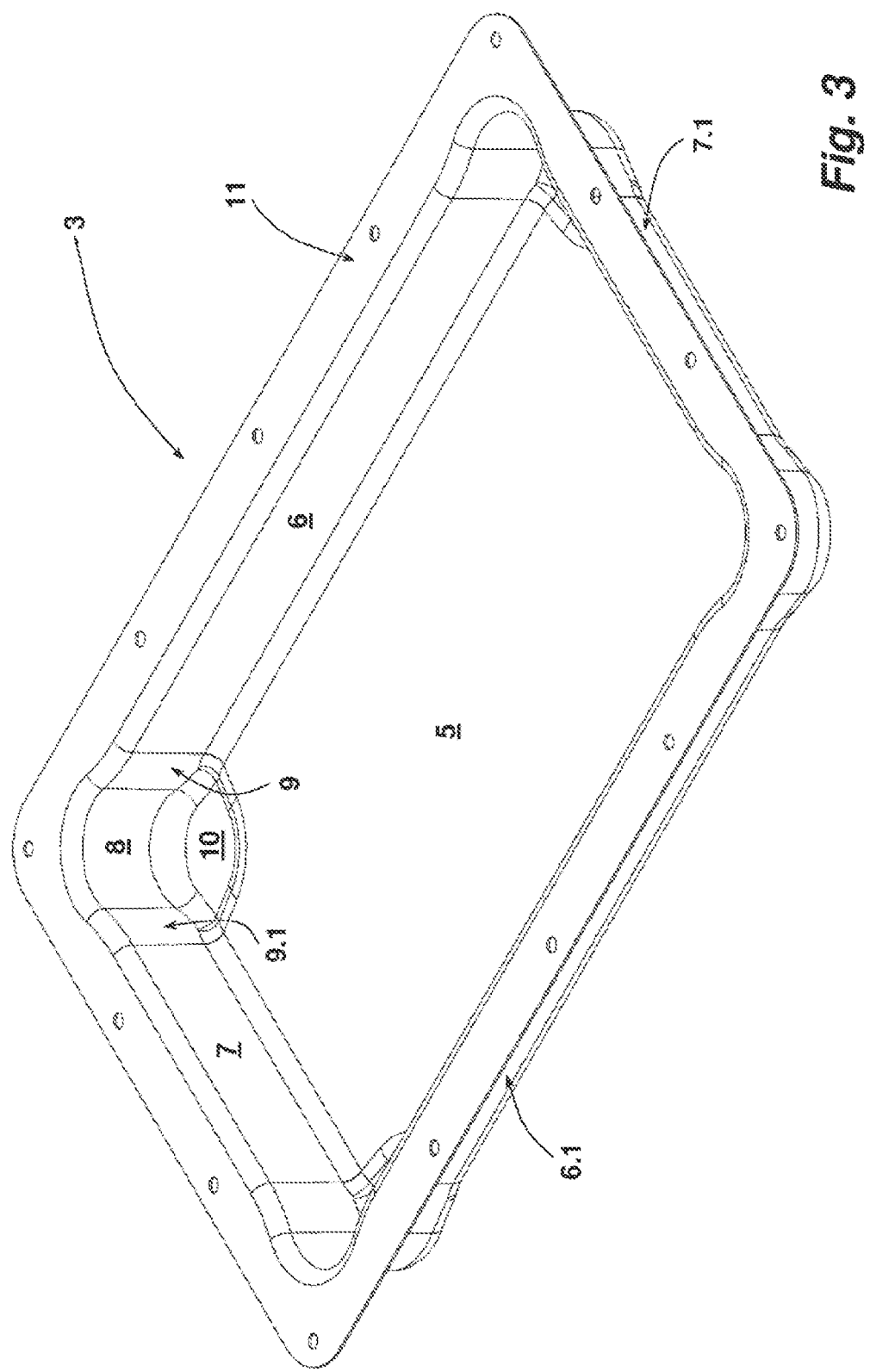
FIG. 3: shows a perspective view into the tray part of the battery housing from FIG. 1.

Adjacent side walls are each connected by a special corner configuration. The rear corner configuration shown in FIG. 3 is explained in greater detail below. The other corner configurations are designed in the same way. Such a corner configuration includes a curved edge section 8. This section is connected to the adjacent side wall 6 or 7, respectively, with a connecting wall section 9 or 9.1, respectively, being connected in between. Thus, the connecting wall sections 9 or 9.1, respectively, are each inserted between a side wall 6 or 7, respectively, and the curved edge section 8. The connecting wall sections 9, 9.1 are curved in the opposite direction to the curvature direction of the edge section 8. This means that the transition from each side wall 6 or 7, respectively, into the crest of the edge section 8 is configured in an S shape. The bottom 5 is impressed in the region of the curved edge section 8 and the connecting wall sections 9, 9.1. This means that the height of the tray part 3 is higher by the measure of the respective impression in the region of the impressed bottom region 10 than in the region of the unimpressed bottom 5.

It is apparent from FIG. 3 that the transition from the bottom 5 into the adjacent side walls 6, 7 (the same applies to the side walls 6.1, 7.1) is connected with a radius. In the embodiment shown, this radius is about 5 mm. The radius of the curved edge section 8, on the contrary, is multiple times greater than the radius in the transitional region from the bottom 5 into the formed-on side walls 6, 7. In the embodiment shown, the radius of the curved wall section is about 25 mm. The radius of the curvature of the connecting wall sections 9, 9.1 in the opposite direction to the curvature of the edge section 8 is greater than the radius of curvature of the edge section 8, and about 52 mm in the embodiment shown; it is therefore about twice as great as the radius of the curved edge section 8. In the area of the impression forming the bottom region 10, the radius in the transition from the bottom region 10 into the curved edge section 8 is greater than in the transition from the bottom 5 into the side walls 6, 7 formed thereon. In the embodiment shown, the radius is about 10 mm.

As seen in FIG. 3, a circumferential mounting flange 11 facing away from the volume of the tray part 3 is arranged at the top of the tray part 3. The outline of the mounting flange 11 matches the outline and size of a regular battery housing in the embodiment shown.

Figure 4:
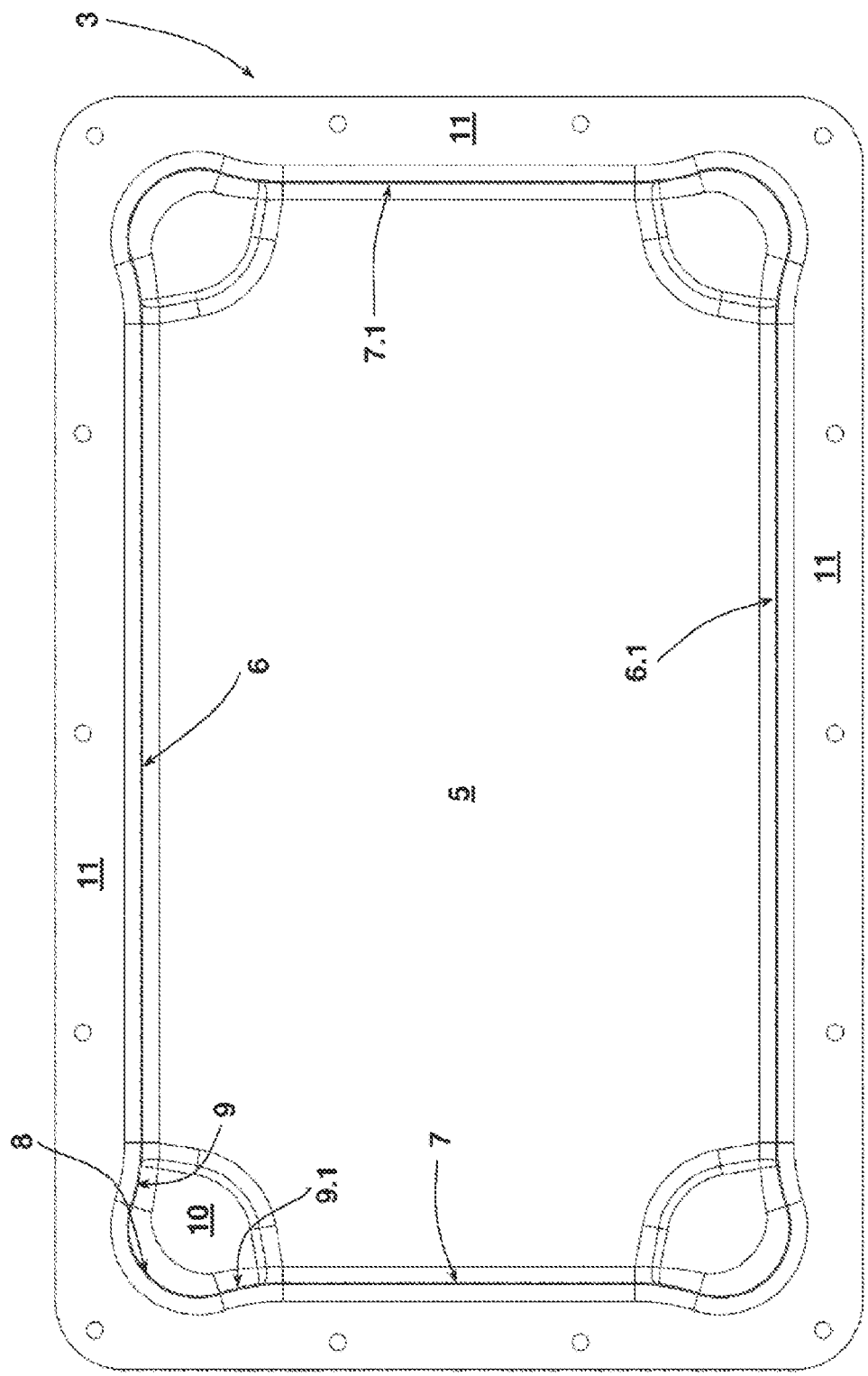
FIG. 4: shows a plan view of the tray part of the battery housing from FIG. 3.

The plan view of the tray part 3 in FIG. 4 makes it clear that the width of the mounting flange 11 may be somewhat less wide in the corner regions due to the corner configuration described above, with its curved edge sections 8 and the connecting wall sections 9, 9.1, than in the side wall regions. The remaining width is still sufficient, as can be seen from FIG. 2, to insert the circumferential gasket 4 for sealing off the battery volume enclosed by the lid part 2 and the tray part 3.

The volume that can be used by one or multiple battery modules that is enclosed by the tray part 3 is considerably greater than that of a conventional tray part. FIG. 5 shows a battery module 12 filling the tray part 3 with respect to the footprint made available by said part. It should be understood that multiple smaller battery modules can be received in the tray part 3 instead of a single battery module. The footprint of the battery module 12 corresponds to the floor area provided by the bottom 5 up to the adjacent radius into the side walls 6, 6.1, 7, 7.1 formed thereon. The battery module 12 uses the footprint provided up to the beginning of the radius on the bottom at the transition to the side walls 6, 6.1, 7, 7.1 This radius of about 5 mm in the depicted embodiment then represents a safety distance between the side surfaces 13 of the battery module 12 and the inner side of the side walls 6, 6.1, 7, 7.1 of the tray part 3. In addition, the battery volume is held centered in the tray part 3 by the circumferential radius.

The configuration of the corner impressions and the bottom regions 10 formed in this manner can be seen in the sectional view of FIG. 6. The region 10 deepened by bottom impressions can be used to accommodate a fastener for the battery module 12. This impression which increases the volume of the tray part 3 can also be used to receive a fastener attached to the battery module 12 itself that projects from the surface of the battery module.

In the embodiment shown, the bottom side 14 of the bottom 5 can easily be connected to a cooling panel of the type commonly used for such purposes, despite the impressions in the corner regions. This is not possible with the subject matter of EP 2 565 958 B1 due to the circumferential groove which is necessarily provided on the bottom side.

Figure 7:
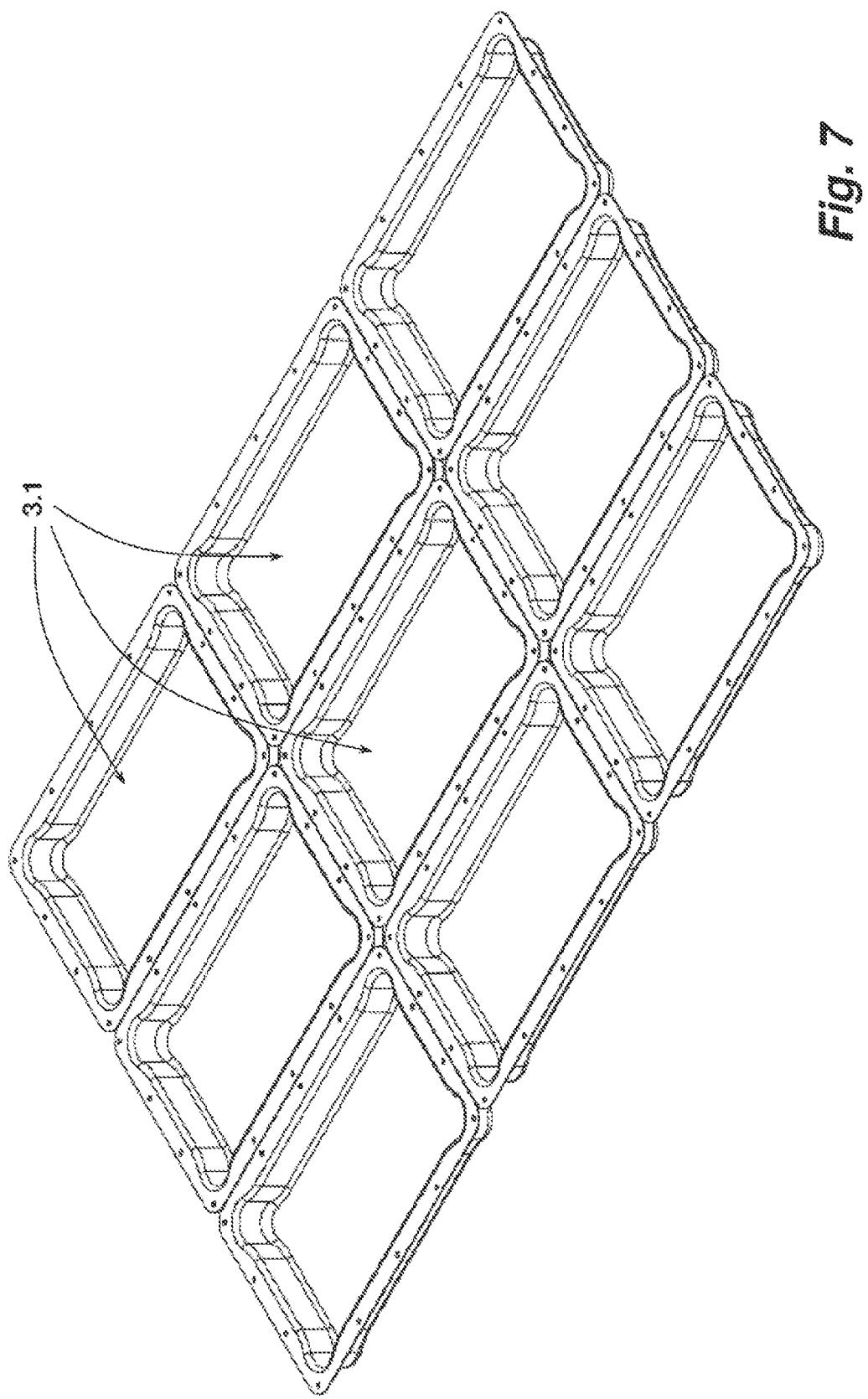
FIG. 7: shows an arrangement of multiple tray parts of battery housings.

Multiple battery housings 1 can be interconnected into larger battery housing units, as is known per se. FIG. 7 shows nine tray parts 3.1 in such an arrangement. The tray parts 3.1 of these battery housings are configured without the corner impressions in the region of the bottom described for the tray part 3 above.

FIG. 8 shows a plan view of a conventional tray part 15 of a battery housing with a battery module 16 inserted therein. The battery module 16 inserted into the tray part 15 uses the available volume as best as possible. It is clearly visible that the side closure of the battery module 16 ends on all sides at a clear distance before the radius in the transition from the bottom to the side walls formed thereon. As can be seen in FIG. 5, this volume is utilized with a battery housing according to the present disclosure. Consequently, the battery module 12 is considerably larger than the battery module 16. The usable footprint in the embodiment of FIGS. 1 to 6 is increased by about 10% compared to the footprint in a tray part 15 according to prior art.

The invention has been described with reference to exemplary embodiments. A person skilled in the art will find numerous other ways to implement the subject matter of the invention without deviating from the scope of the applicable claims. While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

LIST OF REFERENCE SYMBOLS

1 Battery housing
2 Lid part
3, 3.1 Tray part
4 Gasket
5 Bottom
6, 6.1 Side wall
7, 7.1 Side wall
8 Curved edge section
9, 9.1 Connecting wall section 10 Bottom region
11 Mounting flange
12 Battery module
13 Side surface
14 Bottom side
15 Tray part
16 Battery module

The invention claimed is:

1. A battery housing for a vehicle driven by an electric motor comprising:
 a tray part with a bottom and side walls formed thereon, for receiving one or multiple battery module(s);
 wherein the side walls of the tray part are interconnected by curved edge sections, each curved edge section is connected to two adjacent side walls by connecting wall sections therebetween, with each connecting wall section arranged between a respective curved edge section and a respective side wall;
 each connecting wall section, which connects the respective curved edge section with the respective side wall, is curved in an opposite direction to the respective curved edge section; and
 the bottom of the tray part is connected to the side walls, the curved edge sections, and the connecting wall sections via curved transitions therebetween, such that the side walls as well as each curved edge section and each curved connecting wall section are arranged at a distance from the one or multiple battery module(s) when the one or multiple battery module(s) are arranged on the bottom of the tray part.

2. The battery housing of claim 1, wherein the bottom of the tray part includes an impression in each region of the curved edge sections and their respective connecting wall sections, thereby increasing the volume of the tray part.

3. The battery housing of claim 2, wherein a fastening means for fastening a battery module in the tray part is arranged in, or fitted into, the impression.

4. The battery housing of claim 3, wherein the fastening means is a nut which is fixed in the impression, the nut having a female thread opening which faces the inside of the tray part.

5. The battery housing of claim 1, wherein a circumferential mounting flange is arranged facing away from the volume of the tray part on the side walls, the curved edge sections, and the connecting wall sections.

6. The battery housing of claim 1, wherein the tray part is a metal part deep drawn from a plate.

7. The battery housing of claim 6, wherein the tray part is a steel part.

8. The battery housing of claim 1, wherein the battery housing includes a lid part in addition to the tray part.

9. The battery housing of claim 8, wherein the lid part is designed the same as the tray part.

10. The battery housing of claim 8, wherein the lid part is a metal part deep drawn from a plate.

11. The battery housing of claim 10, wherein the lid part is a steel part.

12. The battery housing of claim 8, further comprising clamping fasteners with which the lid part can be clamped to the tray part for closing the tray part.

13. The battery housing of claim 12, wherein a circumferential gasket is arranged between the tray part and the lid part.

* * * * *